(12) United States Patent
Saliba

(10) Patent No.: US 8,355,219 B2
(45) Date of Patent: Jan. 15, 2013

(54) TAPE CARTRIDGE FORMATTED WITH PREDETERMINED ERROR PATTERNS FOR TESTING A TAPE HEAD OF A TAPE DRIVE

(75) Inventor: George A. Saliba, Boulder, CO (US)

(73) Assignee: Saliba Technology Solutions Inc., Boulder, CO (US)

(*) Notice: Subject to any disclaimer, the term of this patent is extended or adjusted under 35 U.S.C. 154(b) by 402 days.

(21) Appl. No.: 12/694,977

(22) Filed: Jan. 27, 2010

(65) Prior Publication Data

US 2011/0181985 A1    Jul. 28, 2011

(51) Int. Cl.
*G11B 27/36* (2006.01)
*G11B 5/09* (2006.01)
*G11B 23/02* (2006.01)
*G11B 5/00* (2006.01)

(52) U.S. Cl. ............. 360/31; 360/48; 360/128; 360/132

(58) Field of Classification Search .................. None
See application file for complete search history.

(56) References Cited

U.S. PATENT DOCUMENTS

2006/0023336 A1* 2/2006 Evans et al. ..................... 360/69
2008/0239544 A1* 10/2008 Saliba ............................. 360/71

* cited by examiner

*Primary Examiner* — Regina N Holder

(57) ABSTRACT

A tape drive assembly for data storage on a magnetic tape includes a tape head, a cartridge receiver and a controller. The cartridge receiver selectively receives a cartridge having a test tape formatted at a predetermined location with data errors with predetermined type, size and distribution representative of data errors in tape drives. The test tape is able to measure the quality of heads in suspect tape drives by comparing the ratio of the error count successfully recovered by the suspect head to that recovered by the reference drive while reading the same error distributions.

3 Claims, 9 Drawing Sheets

TAPE CARTRIDGE FORMATTED WITH PREDETERMINED ERROR PATTERNS FOR TESTING A TAPE HEAD OF A TAPE DRIVE

BACKGROUND

Magnetic storage devices remain a viable solution for the storage and retrieval of large amounts of data. The use of magnetic tape cartridges, e.g., such as half-inch digital linear tape ("DLT"), linear tape open ("LTO") and helical scan tapes formats, such as 4 mm ("DAT", "8 mm") are well known in the art. Tape cartridges can store a vast amount of data. Tape drives can be used either singly as stand alone tape drive or in a tape library (also referred to as a media library).

Generally, each tape drive includes multiple recording and reproducing transducers to write and/or read data to the tape cartridges. Typical modern tape drives use thin film magnetoresistive (MR) head or ferrite core transducers to read and/or writes data to the tape cartridges and are commonly referred to as tape heads. Magnetic storage devices are generally read/write capable and may be erased and written over many times during their lifetime.

For proper operation of the tape drive and to be able to record and reproduce data from the tape with acceptable data errors, the head must maintain very close proximity to the storage tape of the tape cartridge in order to provide the ability to record and reproduce signals. The head operates in an open environment and can be exposed to various contaminants from the open air and/or from the storage tape itself. Today's heads require very low separation between the head and the storage tape for greater accuracy in reading and writing of data. Excessive separation between the head and the storage tape and/or sensor damage such as scratches, nicks or other abrasions to the head itself can result in reading and writing errors or even head failure.

It is well known that tape to head separation increases when contaminants build up on the surface of the head. Cleaning cartridges or brushes can be used to remove contaminants. Unfortunately, these types of cleaning devices can be relatively ineffective for removing hardened deposits on the head. Further, when the sensor of the head is impacted with sufficient force, or when a conductive material causes a short in an element in the head, the head is rendered unusable and the drive must be repaired. In addition, contaminants and tape abrasive materials can generate surface scratches that effectively create permanent separation between the tape and the sensor. These defects will also reduce the head signal, requiring repair to the head.

Tapes are made of flexible basefilm such as PEN, PET or Poly-Aramid. The basefilm is coated with a very thin magnetic recording layer where the data is recorded. It is also well known that during normal operations, tapes degrade and lose their recording properties with repeated use of the same tape due to surface scratches caused by the running of the tape at close contact with the head. Furthermore, airborne contaminants deposited on the tape can cause tape surface damage such as scratches, nicks or other abrasions. Deposits, contaminants, or abrasions on the tape surface can result in reading and writing errors or even drive failure.

Presently, the drive diagnosis is lengthy, complex and costly. For example, when a tape drive fails within a media library, it is not possible to determine with certainty if the cause of the failure is marginal head or tape as both can produce data errors. In the case where multiple drives record data on the same cartridge, then it is virtually impossible to determine the marginal drive that caused the error, especially when the failure is compounded by a combination of the marginal heads and marginal media. Therefore, measuring the drive error rate is not a reliable method in identifying the marginal defective head.

The current practice in the tape industry is to ship the suspect drives back to the factory for extensive testing where the drives are disassembled and the suspect heads are carefully removed from the drives. Suspect heads are returned to the head vendors for test and possible repair. The head repair procedure can be proprietary to each head vendor, further complicating the entire head test process. Typically, nearly half of the drives returned by customers with suspected failure are found to have no problem and the failure was likely caused by marginal or defective media in the field. The current process consists of a complete and costly retest at the factory without the need for actual repair, the drive is returned so that it can be reinstalled for the customer.

Accordingly, methods and systems to determine with certainty the cause of data failures in the field, as caused by marginal head or media, and the need to eliminate the requirement for the costly and extensive factory diagnosis and associated head removals and tests, are highly desired.

SUMMARY

The present invention is directed toward a tape drive assembly for the storage of magnetic data on a tape cartridge. In one embodiment, the tape drive assembly includes a tape head, a cartridge receiver and a controller. The tape head magnetically interacts with the storage tape. The cartridge receiver selectively receives a cartridge having a test tape formatted with a predetermined error pattern to deterministically test the drive head quality. In this embodiment, the controller dynamically and/or intelligently, based on the result of each test, determines the ability of the head to read and write data by emulating the errors experienced by drives and tapes with varying quality. The algorithm determines the head quality and, if necessary, initiates corrective actions such as cleaning requests or head lapping. If all corrective actions fail, the algorithm may decide to request a drive replacement or to call home and request service.

In some embodiments, the controller reserves certain sections of the tape and writes data formatted with predetermine distributions of typical tape error types with varying duration, count and magnitude.

An embodiment of the present invention is also directed toward one or more methods for testing of the quality of the head of the drive.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Figure 1:
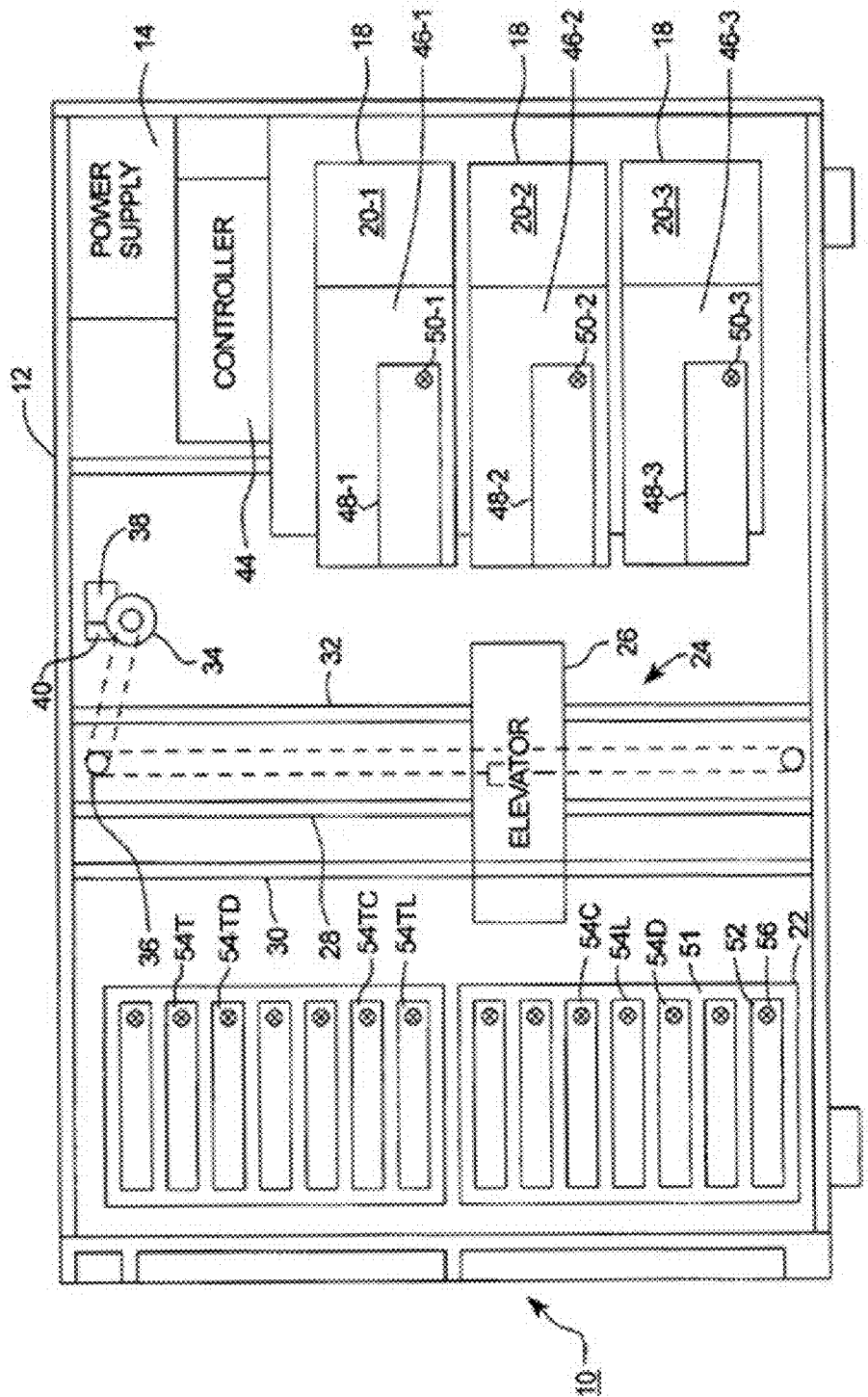
FIG. 1 is a block diagram of one embodiment of a media library having features of the present invention including a plurality of tape drives and a plurality of tape cartridges.

FIG. 1 is a simplified schematic view of one embodiment of a media library 10, in the form of a multi-drive, mass storage and retrieval tape library/loader unit. In one embodiment, the media library 10 includes a housing 12, a power supply 14, a plurality of drive assembly receivers 18, a plurality of tape drive assemblies 20-1, 20-2, 20-3 (also sometimes generically referred to as tape drive assemblies 20), one or more cartridge retainer receivers 22, a cartridge mover 24 including a cartridge pass-through and/or rotating elevator 26, at least one cartridge elevator guide shaft 28, a drive shaft 30, a rack drive shaft 32, a cartridge elevator motor 34, a pulley drive assembly 36, a roller drive shaft motor 38 and a rack drive shaft motor 40. The housing 12 may be constructed of any number and/or type of conventional materials such as, for example, those utilized in industry standard rack mount cabinets. It is recognized that many different suitable types of cartridge movers 24 can be utilized in the media library 10, and that the cartridge mover 24 provided herein is merely representative of one such type and is not intended to limit the scope of the present invention in any manner.

In this embodiment, the power supply 14 can provide electrical power to the plurality of drive assembly receivers 18, one or more of the tape drive assemblies 20, the cartridge elevator motor 34, the roller drive shaft motor 38, and/or the rack drive shaft motor 40. The power supply 14 is interfaced with these components as well as with an external power source using industry standard cabling and connections (not shown).

Each of the drive assembly receivers 18 receives one of the tape drive assemblies 20. As provided herein, each of the tape drive assemblies 20 can include a corresponding tape drive 46-1, 46-2, 46-3 (i.e. Quantum DLT 2000XT™, DLT4000™, DLT7000™, DLT8000™, DLT VS80™, DLT VS160™, DLT V4™, DLT S4™, SDLT 320™, SDLT 600™, LTO-2™, LTO-2 HH™, LTO-3™, LTO-3 HH™, LTO-4 HH™, LTO-5 HH™, DAT 72™, DDS-4™, or equivalent, as non-exclusive examples).

The tape drive assemblies 20-1, 20-2, 20-3 within the media library 10 can be substantially identical to one another. Alternatively, one or more of the tape drive assemblies 20-1, 20-2, 20-3 within the media library 10 can be different from the remaining tape drive assemblies 20-1, 20-2, 20-3 in the media library 10. The tape drive assemblies 20 include one or more controllers 44 (one controller 44 is illustrated in FIG. 1). In one embodiment, each tape drive assembly 20-1, 20-2, 20-3 includes a separate controller 44. Alternatively, the tape drive assemblies 20-1, 20-2, 20-3 can share a single controller 44.

Each tape drive 46-1, 46-2, 46-3 (generically referred to as tape drive 46) includes a cartridge receiver 48-1, 48-2, 48-3 (generically referred to as receiver 48) and a corresponding cartridge sensor 50-1, 50-2, 50-3 (generically referred to as sensor 50) within the cartridge receiver 48. The cartridge receiver 48 receives one of a plurality of cartridges 54D, 54L, 54O, 54T, 54TC, 54TL, 54TD (generically referred to as cartridge 54), which are adapted for use in the media library 10. The cartridge sensor 50 can generate a cartridge presence signal when the cartridge 54 is present within the cartridge receiver 48 of the tape drive 46. This signal from one tape drive 46 can be provided to the controller 44 and/or to another tape drive 46 in the same media library 10 or in a different media library 10.

Each of the cartridge retainer receivers 22 can receive a standard cartridge retainer 51, such as a tape magazine in one non-exclusive example, which includes a plurality of cartridge receivers 52. The cartridge retainer 51 includes a cartridge presence indicator 56 within each cartridge receiver 52 which indicates the presence and/or absence of a cartridge 54 within the cartridge receiver 52.

In the embodiment illustrated in FIG. 1, the cartridge mover 24 is positioned within the housing 12 between the plurality of cartridge receivers 52 and the plurality of cartridge retainer receivers 22. In this manner, the cartridge mover 24 is able to load and unload one of the cartridges 54 to and from all of the tape drives 46 and cartridge retainers 51 within a given media library 10. Further, the input of one or more cartridges 54 into the cartridge receiver 52 of one or more tape drives 46 can be automated, or it can be manually undertaken by an operator, for example.

In the embodiment illustrated in FIG. 1, the controller 44 is physically positioned remotely from the tape drives 46. In an alternative embodiment, the controller 44 is incorporated into one or more of the tape drives 46. For example, the controller 44 can physically reside within or on one or more of the tape drives 46.

In one embodiment, the controller 44 can include a standard driver interface unit for receiving digital commands and translating the commands into driving currents, such as step pulses for controlling stepper motors. Further, the controller 44 can include a standard programmable general purpose computer formed on a single plug-in card unit and preferably includes a programmed microprocessor or microcontroller according to the present invention, memory, communication interface, control interface, connectors, etc. The controller 44 can form part or all of the drive circuitry, which can include or comprise a printed circuit board assembly (not shown), in one non-exclusive example.

The media library 10 can use well-known industry standard cabling and communication protocols between the controller 44 and other components of the media library 10. Cabling and electrical characteristics including signaling protocols can be generally standardized, and the logical message protocols can be either proprietary or standardized as known to those skilled in the art.

Additionally, as set forth in greater detail below, the controller 44 can determine whether a problem with one or more tape drives 46 may be occurring. For example, the controller 44 can monitor the reading and/or writing error rate of the tape drive 46 to determine if this error rate is above a predetermined threshold. If so, the controller 44 can take certain steps to mitigate or reduce the error rate, as described below. Alternatively, the controller 44 can on a preset schedule run preventive tests using the cartridge in accordance one or more embodiments described herein. In certain embodiments, the controller can use an algorithm that is based on one or more of the algorithms in accordance one or more embodiments described herein to determine whether corrective action is required for the tape drive, as more fully described below. In an alternative embodiment, The types of cartridges 54 in the media library 10 can vary. For example, the cartridges 54 can include one or more data cartridges 54D, one or more test cartridges 54T, one or more lapping cartridges 54L, one or more cleaning cartridges 54C, one or more combined test and cleaning cartridges 54TC, one or more combined test and data cartridges 54TD, and/or one or more combined test and lapping cartridges 54TL. The data cartridge 54D includes a magnetic storage tape that is adapted to store data. The test cartridge 54T includes formatted tape with predetermined errors that is adapted to perform a test operation on of the tape drive 46.

Any number of each type of cartridge 54 can be present within the media library 10 to satisfy the design requirements of the media library 10. In certain embodiments, all seven types of cartridges 54D, 54T, 54L, 54C, 54TC, 54TL, 54TD are present. Alternatively, one or more of these types of cartridges 54D, 54T, 54L, 54C, 54TC, 54TL, 54TD may be absent from the media library 10. Still alternatively, the media library can also include other types of cartridges, such as a combined cartridge 54TC that includes a cleaning tape for cleaning dust or other particulates from portions of the tape drive 46 and a test tape. Still alternatively, the media library can also include other types of cartridges, such as a combined cartridge 54TD that includes a data tape and a test tape. Still alternatively, the media library can also include other types of cartridges, such as a combined cartridge 54TL that includes a lapping tape and a test tape.

In one embodiment, two or more different types of cartridges 54D, 54T, 54L, 54C, 54TC, 54TL, 54TD generally have a substantially similar form factor. In another embodiment, the form factor for two or more of the cartridges 54D, 54T, 54L, 54C, 54TC, 54TL, 54TD can be different.

Figure 2:
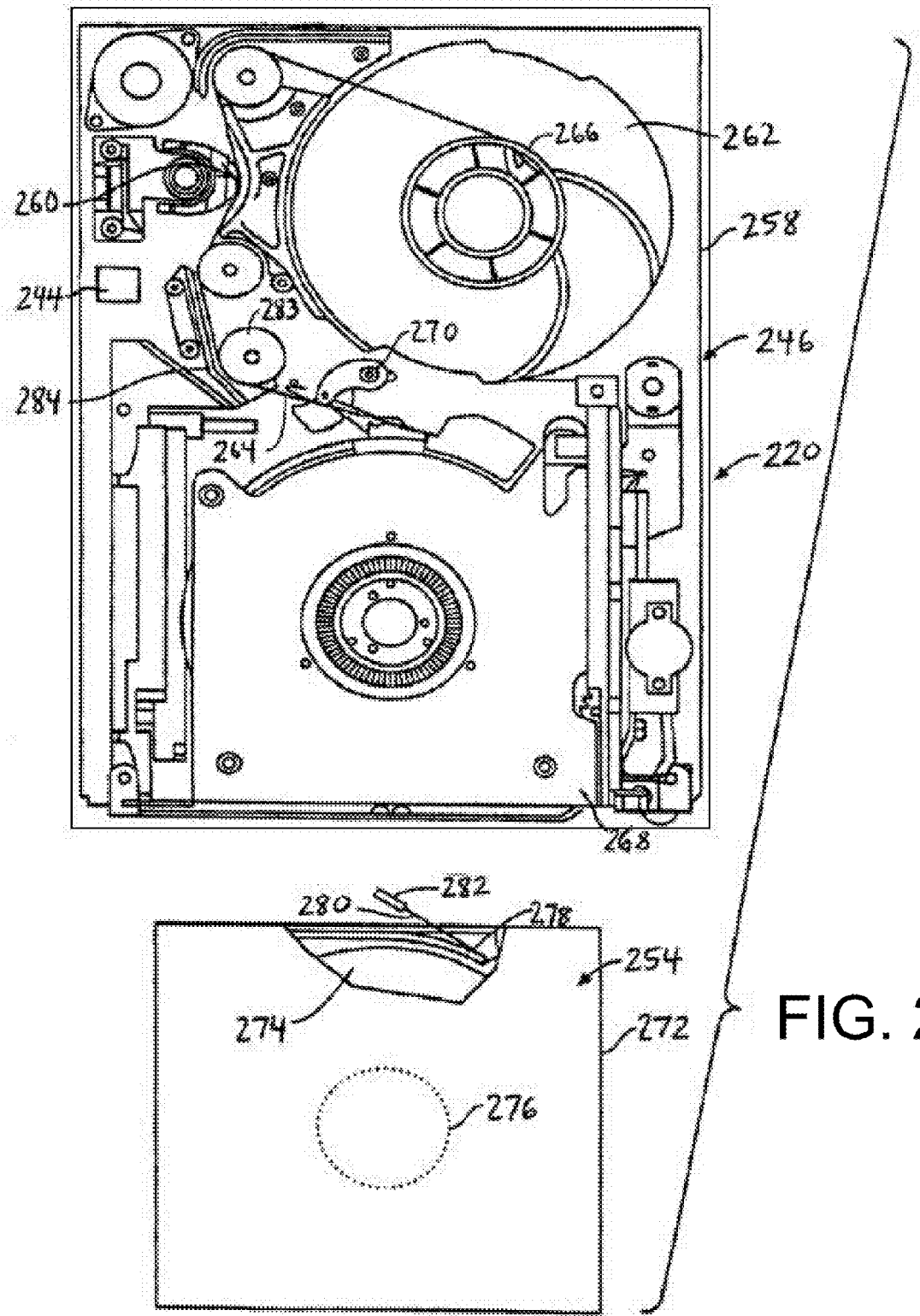
FIG. 2 is a top view of a portion of one embodiment of the tape drive and the tape cartridge.

FIG. 2 illustrates one embodiment of a cartridge 254 and the tape drive assembly 220, which includes one tape drive 246. It is recognized that the tape drive assembly 220 described herein can be part of the media library 10 as illustrated in FIG. 1, or the tape drive assembly 220 can be a stand-alone type of assembly.

In the embodiment illustrated in FIG. 2, the tape drive 246 includes a drive housing 258, a tape head 260, a take-up reel 262 having a drive leader 264 and a take-up reel hub 266, a cartridge receiver 268, a buckler 270 and the controller 244. In one embodiment, the cartridge 254 includes a cartridge housing 272, a cartridge reel 274 having a cartridge hub 276 (shown in phantom), a tape 278, and a cartridge leader 280 having a cartridge buckle component 282. The buckler 270 secures the drive leader 264 to the cartridge leader 280. The buckler 270 moves the drive leader 264 relative to the cartridge leader 280 to automatically buckle and/or unbuckle the drive leader 264 to the cartridge leader 280 in ways known to those skilled in the art. Further, the specific type of buckler 270 included in the tape drive assembly 220 can include any type of device that secures the drive leader 264 to the cartridge leader 280, and can be varied in ways known to those skilled in the art.

The drive housing 258 retains the various components of the tape drive 246, including at least the tape head 260 and the cartridge receiver 268. In the embodiment illustrated in FIG. 2, the tape drive 246 further includes a plurality of tape rollers 283 and tape guides 284 which are coupled or directly secured to the drive housing 258. The tape rollers 283 and tape guides 284 guide the tape 278 along a tape path across the tape head 260 and onto the take-up reel 262. In one embodiment, the tape drive 246 includes three tape rollers 283 and two tape guides 284. However, any suitable number of tape rollers 283 and/or tape guides 284 can be included in the tape drive 246.

The tape 278 is secured to the cartridge hub 276 on one end and the cartridge leader 280 on the other end. As illustrated in FIG. 2, the cartridge 254 includes a single cartridge reel 274. In an alternate embodiment (not shown), the cartridge 254 can include two or more cartridge reels 274.

In this embodiment, the tape drive 246 also includes a take-up reel motor (not shown) that rotates the take-up reel 262, and a cartridge reel motor (not shown) that rotates the cartridge reel 274. The rotational force of the take-up reel motor relative to the cartridge reel motor determines the tension of the tape 278 moving across the tape head 260. In certain embodiments, the controller 244 dynamically controls the rotational force of the take-up reel motor and the cartridge reel motor to dynamically control the tension of the tape 278 relative to the tape head 260. In alternative embodiments, the tension of the tape 278 can also or alternatively be controlled by the controller 244 in other suitable ways, such as by controlled movement of the tape head 260 toward and/or away from the tape 278, or vice versa.

In one embodiment, the tape 278 of one of the cartridges 254 includes a storage tape only, which magnetically stores data in digital form. In another embodiment, the tape 278 of one of the cartridges 254 includes a test tape only, which includes prewritten data formatted with predetermined errors types and magnitudes to test the head and to determine the head quality factor to read the errors.

Figure 3:
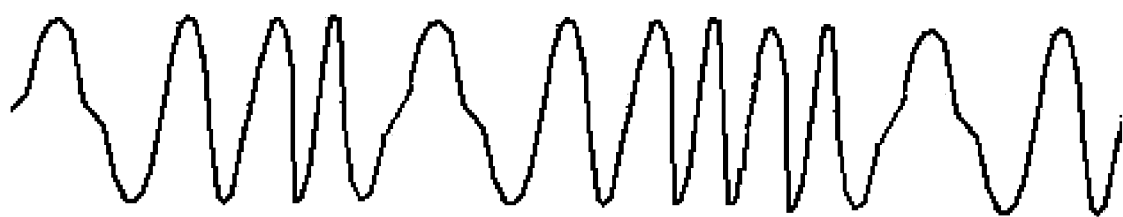
FIG. 3 is a typical data signal recoded on the tape without errors.

FIG. 3 is a data pattern excluding media defects caused errors as commonly observed when recording new media in a new tape drives. Tape drives employ the read after write process to skip the portion of the tapes with defects.

Figure 4:
FIG. 4 is a Data signal showing the effect of long error formatted according to one embodiment of a tape error of the tape cartridge.

FIG. 4 is a data pattern with formatted defects superimposed on the original signal with predetermined size, shape and depth simulating a long scratch on the media. The preferred size of the long defects is between 1 micro second to 1 millisecond and the preferred signal reduction is between 75 percent of original signal and 25 percent of original signal.

In one embodiment, the test tape cartridge 54T is used for testing purposes in order to determine the performance level of the tape head and its ability to read long errors with predetermined sizes. In an alternative embodiment, the test tape 54T can be used both for testing the tape drive, for read head quality, as well as for write head quality. The reference drive records an error pattern on a predetermined section of the tape. The suspect drive reads the same section and collects the error. By comparing the ratio between the reference drive error and the suspect drive error of the same section, the read transducer quality of the suspect head can be determined. The reference drive records an error pattern on a predetermined section of the tape. The suspect drive reads the same section and collects the error. The suspect drive overwrites the same section and collects the error data count. By comparing the ratio between the reference drive error and the suspect drive error of the same section, the write transducer quality of the suspect head can be determined.

In an alternative embodiment, the function of test tape 54T may be combined with data tape 54D for both testing and storing customer data storage. In an alternative embodiment, the test tape 54T may be combined with cleaning tape 54C for both testing the tape drive and for head cleaning in the same cartridge. In an alternative embodiment, the function of test tape 54T may be combined with lapping tape 54L for lapping of the head by using a lapping tape in the test cartridge.

The proportion of the total length of the test tape and data tape, cleaning tape or lapping tape, can vary depending upon the design requirements of the tape drive assembly 20 and/or the media library 10. In one embodiment, the ratio of test tape to data tape, cleaning tape or lapping tape can be at least approximately 0.01, 0.1, 0.5, 0.75, 0.9, 1.1, 1.25, 1.5, 2.0, 5.0, 10.0 or 100.0. Still alternatively, the ratio can be above or below the foregoing range.

The specific design of the test tape can vary to suit the design requirements of the tape drive assembly 20 and/or the media library 10. In one embodiment, the test tape can include an abrasive material such as a 0.1 micron diamond material. In non-exclusive alternative embodiments, the lapping tape can include a 0.5 micron or a 1.0 micron diamond material. Still alternatively, the test tape can incorporate cleaning tape material suitable to provide the requisite cleaning level of the tape head.

The length of the test tape section can likewise be varied. In one embodiment, the length of the test tape can be approximately 20 feet. Alternatively, the length can be less than or greater than this length.

In one embodiment, the test tape may be formatted as a dedicated test cartridge specific for testing the heads. In another embodiment, the test tape may be formatted as a reserved section of the data tape. In another embodiment, the test tape may be spliced together with a cleaning tape in a similar manner that other types of magnetic recording tapes are spliced together, i.e. in a manner known to those skilled in the art. In another embodiment, the test tape may be spliced together with a lapping tape in a similar manner that other types of magnetic recording tapes are spliced together, i.e. in a manner known to those skilled in the art. Further, the storage tape and/or the lapping tape can each be uninterruptedly positioned within the cartridge, or the storage tape and/or the lapping tape can alternate, e.g., be intermittently or alternatingly positioned within the cartridge.

Figure 5:
FIG. 5 is a Data signal showing the effect of short error formatted according to one embodiment of a tape error of the tape cartridge.

FIG. 5 is a data pattern with formatted defects superimposed on the original signal with predetermined size, shape and depth simulating short contaminants of new media defects. The preferred size of the short defects are between 0.1 micro second and 1 micro second and the preferred signal reduction is between 10 percent and 90 percent of the average signal.

Figure 6:
FIG. 6 is a Data signal showing the effect of single pulse error, formatted according to one embodiment of a tape error of the tape cartridge.

FIG. 6 is a data pattern with formatted defects superimposed on the original signal with predetermined size, shape and depth simulating short contaminants of new media defects. The preferred size of the single bit defects are between 0.01 micro second and 1 micro second and the preferred signal reduction is between 10 percent and 90 percent of the average signal.

Figure 7:
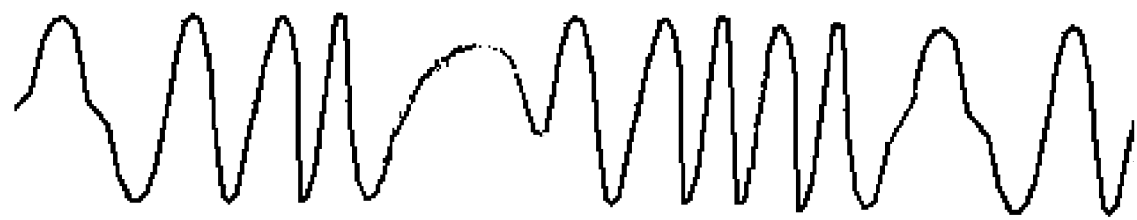
FIG. 7 is a Data signal showing the effect of data distortion formatted according to one embodiment of a tape error of the tape cartridge.

FIG. 7 is a data pattern with formatted defects superimposed on the original signal with predetermined size, shape and depth simulating distortions as commonly caused by head to tape separation, foreign magnetic particles or media defects. The preferred size of the single bit defects are between 0.01 micro second and 10 micro seconds and the preferred signal reduction is between 10 percent and 50 percent of the average signal.

Alternatively, the relative types, durations and magnitudes of the formatted errors can be different than that which is illustrated. The cleaning tape may be a relatively abrasive or non-abrasive type of tape, known to those skilled in the art, which may remove dust and or other loose particulates that may be present on the tape head. The cleaning tape may be formed from a material such as that used in LTO Universal Cleaning cartridge, DLT Cleaning Cartridges or DAT Cleaning cartridge.

Figure 8:
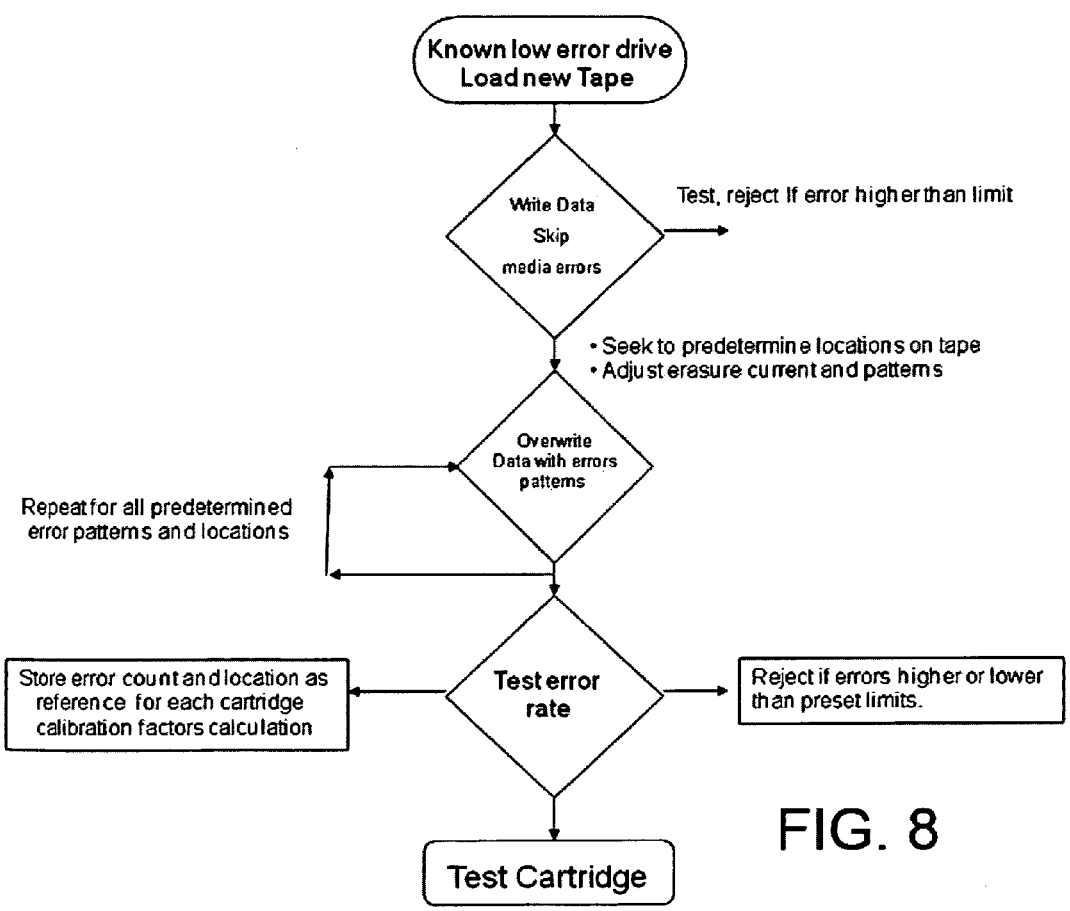
FIG. 8 is a flow diagram illustrating the method for formatting the tape cartridge in accordance with the present invention.

FIG. 8 is a flow diagram illustrating one embodiment of a method for formatting the test cartridge in accordance with the present invention.

In this embodiment, during the tape formatting phase, a reference drive, such as a new drive or a drive with a known low error rate, as verified by using multiple low error new cartridges, is selected to format the test cartridge. The process is similar to standard data writing with the limitation that the data must be written and read by at least every head transducer. For linear tape, the data must be written in both directions. Typical tape immediate read after write operation insures that the written data is verified for correct recording and media defects are detected and rewritten (skipped). One more read pass is necessary for the tape controller to determine whether the read errors are below the predetermined threshold level.

It is recognized that the predetermined threshold can be included as part of the firmware or drive circuitry of the tape drive and/or media library, or it can be manually input by an operator as required.

If the predetermined threshold of read errors is exceeded, the tape is not a good candidate for a test tape and is rejected.

The next step in the formatting process is to seek to a predetermine location on the tape to format the data errors according to the invention. The location is a design parameter, however, it is recognized that the preferred location is near the beginning of the tape in order to minimize the test time. For linear tape drive, such as LTO and DLT, the preferred location is between 10 meters and 500 meters or within the first half of the first forward track and within the last half of the reverse track. However, it is understood that the format error location may be formatted at any predetermined location on the tape.

One preferred method to generate the predetermined error sizes and shapes is to first write data to the tape and skip media defects, then to overwrite the data with a varying error generator signal consisting of a controlled amplitude and shape at the desired location on the tape. Any other suitable methods or external magnetic transducers may be used to generate the magnetic signal to create the desired error patterns. One preferred method is to use the tape drive's write transducer to create the errors by modifying the standard recording signal shape and process to match the desired error. During the error formatting step using the write transducer, the drive must disable the read after write defect skipping step and preserve the formatted errors so they can be observed during the drive test process.

The last step in the error formatting process is to measure the errors count and location for each test cartridge as tested by the reference drive. The cartridge error count is recorded and used as a calibration factor for the drive tested using the cartridge as described herein.

Figure 9:
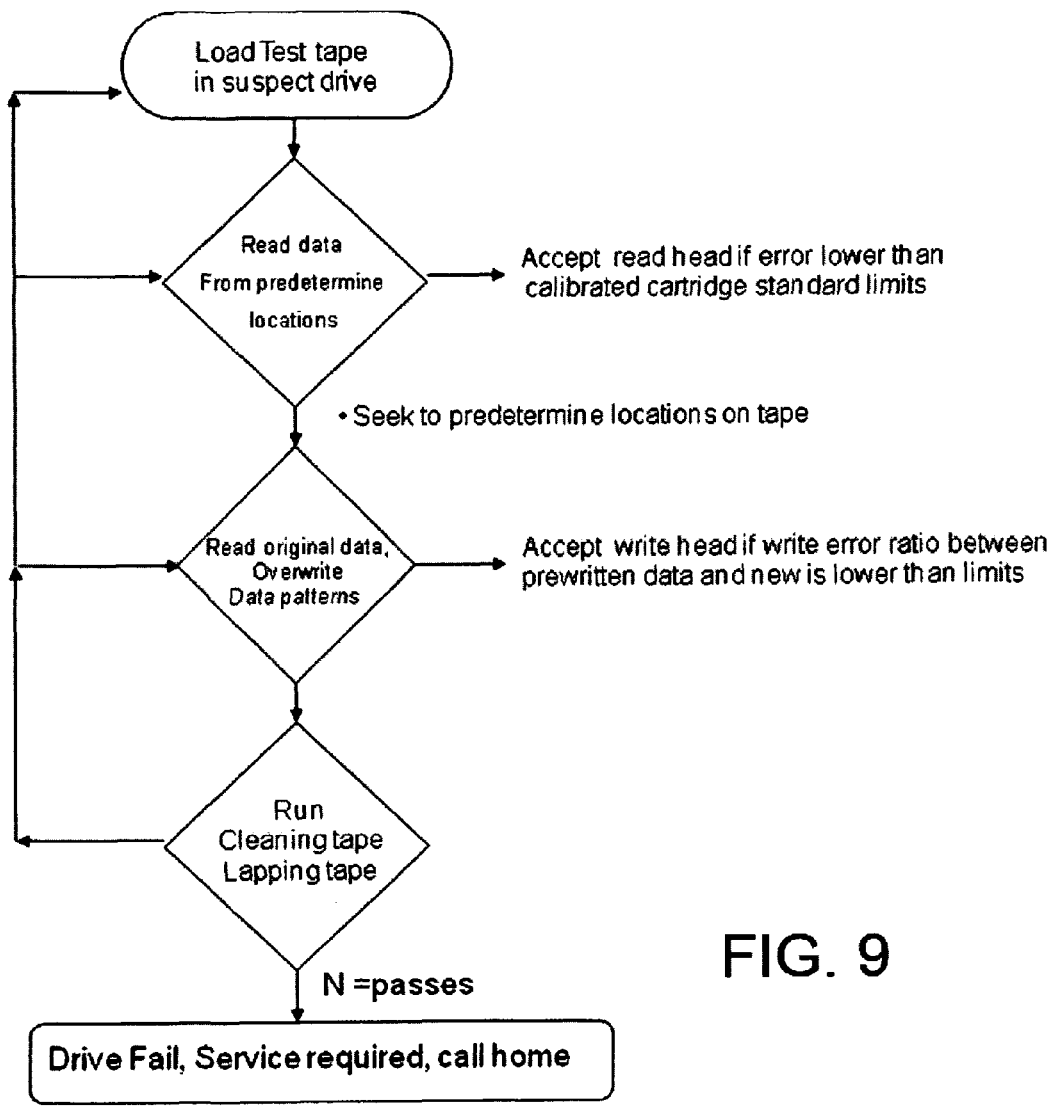
FIG. 9 is a flow diagram illustrating the method for testing of the head in accordance with the present invention.

FIG. 9 is a flow diagram illustrating one embodiment of a method for the test of suspect drive using the test cartridge in accordance with the present invention.

In this embodiment, the test cartridge is used to determine the quality of a suspect drive. The process is similar to standard data reading and writing. The controller requests data to be read from a predetermined location. The read and write error rate of the current drive under test are compared with the calibration data stored during the cartridge generation. The suspect drive quality is determined by comparing its ability to recover data when exposed to the various predetermined errors formatted on the test tape. The relative quality of the suspect drive is calculated as the ratio of the error count to the reference drive error count.

The last step in the test process, the controller may initiate insertion of a cleaning cartridge into the tape drive, and subsequent cleaning of the tape head in an attempt to repair the drive.

Once cleaning of the tape head has concluded, the controller can initiate reinsertion of the data cartridge test cartridge. The controller may run test tape to determine if they are still above the predetermined threshold. If not, no further corrective action is necessary. However, if the test cartridge limits are determined by the controller to exceed the predetermined threshold, the controller can take the tape drive off-line (such as in a media library setting) and can initiate insertion of a lapping cartridge and a subsequent lapping operation of the tape head.

Once the lapping operation has concluded, the controller can initiate reinsertion of the data cartridge into the tape drive. The controller can then insert the test tape to determine whether they exceed the predetermined threshold level. If not, no further corrective action is necessary.

It is to be understood that the test tape is formed by using standard data tape formatted with predetermine errors. The invention can be applied as separate test cartridges, on a predetermined segment of standard data tape or in the same cartridge in combination with cleaning tape or lapping tape by using commonly known tape splicing techniques. Furthermore, this test operation can be applied to determine the need and apply remote corrective non-intrusive traditional drive repair such as updating the micro code of the tape drive and any other suitable tape drive settings prior to restoring the tape drive to an on-line status.

While the particular media library 10 and tape drive assemblies 20 as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A tape cartridge for cleaning a tape drive having a tape head, the tape cartridge comprising: a cartridge housing; a cartridge reel that is rotatably secured to the cartridge housing; and a tape that is secured to the cartridge reel, the tape including a section formatted with predetermined data errors; wherein the section formatted with predetermined data errors is not overwritten or cleared during testing.

2. A tape cartridge for cleaning in a tape drive having a tape head, the tape cartridge comprising: a cartridge housing; a cartridge reel that is rotatably secured to the cartridge housing; and a tape that is secured to the cartridge reel, the tape including a data section formatted with predetermined data errors spliced together with cleaning tape for cleaning the head; wherein the section formatted with predetermined data errors is not overwritten or cleared during testing.

3. A tape cartridge for lapping in a tape drive having a tape head, the tape cartridge comprising: a cartridge housing; a cartridge reel that is rotatably secured to the cartridge housing; and a tape that is secured to the cartridge reel, the tape including a data section formatted with predetermined data errors spliced together with lapping tape for lapping the head; wherein the section formatted with predetermined data errors is not overwritten or cleared during testing.

* * * * *